(12) United States Patent
Clement

(10) Patent No.: US 7,658,266 B1
(45) Date of Patent: Feb. 9, 2010

(54) TRUCK BED STAIRCASE DEVICE

(75) Inventor: Mark A. Clement, Dorchester, SC (US)

(73) Assignee: Norfolk Southern Corporation, Norfolk, VA (US)

( * ) Notice: Subject to any disclaimer, the term of this patent is extended or adjusted under 35 U.S.C. 154(b) by 622 days.

(21) Appl. No.: 11/187,926

(22) Filed: Jul. 25, 2005

(51) Int. Cl.
B62D 33/02 (2006.01)

(52) U.S. Cl. ............... 182/132; 182/115; 182/123; 182/127; 280/163; 280/164.2

(58) Field of Classification Search .......... 182/115, 182/123, 127, 132; 296/50, 53, 62, 65.13, 296/180; 280/163, 164.2, 291
See application file for complete search history.

(56) References Cited

U.S. PATENT DOCUMENTS

| | | | |
|---|---|---|---|
| 3,698,511 A * | 10/1972 | Dohan | 182/113 |
| 3,750,351 A * | 8/1973 | Greenburg | 52/64 |
| 4,151,895 A | 5/1979 | Rasada, Jr. et al. | |
| 4,369,984 A | 1/1983 | Hagen | |
| 4,421,189 A | 12/1983 | Watkins et al. | |
| 4,424,751 A | 1/1984 | Blöchlinger | |
| 4,790,548 A | 12/1988 | Decelles et al. | |
| 4,915,573 A | 4/1990 | Wapner et al. | |
| 5,005,850 A | 4/1991 | Baughman | |
| 5,039,119 A | 8/1991 | Baughman | |
| 5,156,432 A * | 10/1992 | McCleary | 296/61 |
| 5,228,707 A | 7/1993 | Yoder | |
| 5,277,436 A | 1/1994 | Frank et al. | |
| 5,312,150 A | 5/1994 | Quam | |
| 5,360,308 A | 11/1994 | Hansen | |
| 5,788,311 A * | 8/1998 | Tibbals | 296/62 |
| 5,806,627 A | 9/1998 | Wilson | |
| 5,816,638 A * | 10/1998 | Pool, III | 296/26.11 |
| 5,941,342 A * | 8/1999 | Lee | 182/95 |
| 6,237,523 B1 | 5/2001 | Day et al. | |
| 6,328,120 B1 | 12/2001 | Häussler et al. | |
| 6,361,011 B1 | 3/2002 | Brutsaert | |
| 6,502,730 B2 * | 1/2003 | Johnson | 224/519 |
| 6,539,572 B2 | 4/2003 | Ware | |
| 6,763,912 B2 * | 7/2004 | Robinson et al. | 182/115 |
| 6,810,995 B2 * | 11/2004 | Warford | 182/115 |
| 6,948,732 B2 * | 9/2005 | Amacker | 280/415.1 |
| 7,070,220 B1 * | 7/2006 | Lantaigne | 296/26.08 |

* cited by examiner

Primary Examiner—Alvin C Chin-Shue
Assistant Examiner—Colleen M Quinn
(74) Attorney, Agent, or Firm—Hunton & Williams LLP

(57) ABSTRACT

An embodiment of the present invention relates to a staircase device adapted to fit a bed of a truck, or other similar vehicle. The staircase provides a mechanism for facilitating the loading and unloading of items onto and off a bed of a truck. An embodiment of the present invention is directed to a vehicle staircase device comprising a first lower platform having a first length and a first width, the first lower platform having a hitch connector adapted to connect to a vehicle; a second platform having a second length and a second width, wherein the first lower platform and the second platform are substantially parallel; and a staircase structure connecting the first lower platform and the second platform.

16 Claims, 3 Drawing Sheets

TRUCK BED STAIRCASE DEVICE

FIELD OF THE INVENTION

The present invention relates generally to a staircase device, and more specifically to a staircase device adapted to be connected to a bed of a truck or other vehicle.

BACKGROUND OF THE INVENTION

Trucks and other similar vehicles generally have an extended bed portion that may be used to transport large objects. For example, anyone may want to use a truck to transport large objects (e.g., furniture, equipment, etc.). Individuals or business owners may need trucks to transport items in bulk, such as raw materials, construction supplies, etc. As trucks are generally higher than most vehicles, it may be difficult to load large objects. In other words, additional effort and strength are generally required to load objects onto the truck safely and easily. Oftentimes, a platform or other structure, separate from the vehicle, may be used to enable users to safely load large heavy objects onto the bed of the truck. However, not all platforms are secure or easily transportable. In other instances, simply more people are needed to assist in the task. There are times when a truck or other vehicle may be used to transport people from one location to another. Due to the height or other limitations, it is oftentimes difficult for people to load onto the bed of a truck in a safe manner.

Other drawbacks may also be present.

SUMMARY OF THE INVENTION

Accordingly, one aspect of the invention is to address one or more of the drawbacks set forth above.

In accordance with an exemplary embodiment of the present invention, a vehicle staircase device comprises a first lower platform having a first length and a first width, the first lower platform having a hitch connector adapted to connect to a vehicle; a second platform having a second length and a second width, wherein the first lower platform and the second platform are substantially parallel; and a staircase structure connecting the first lower platform and the second platform.

In accordance with further aspects of this exemplary embodiment, a portion of the second platform rests on top of a bed of the vehicle; the first length is substantially equal to a length of a bed of the vehicle; the device further comprises a handrail structure proximal to the staircase structure; the handrail structure extends across the first length; the handrail structure comprises two parallel handrails for the staircase structure; the device further comprises an extension section having a third length and connected to the second platform wherein the second length of the second platform and the third length of the extension section is substantially equal to the first length of the first lower platform; the extension section rests on top of a bed of the vehicle; the second platform is substantially flush with a bed of the vehicle; the width of the staircase structure is substantially equal to the first width of the first lower platform; the second length is less than the first length and the second width is greater than the first width; the vehicle is a truck; the device further comprises a brace structure for securely connecting the vehicle staircase device to the vehicle; the brace structure comprises one or more brace devices; the brace structure is connected to one or more of the first lower platform and the second platform; and the vehicle staircase device is suspended from the vehicle.

DETAILED DESCRIPTION OF THE INVENTION

An embodiment of the present invention relates to a staircase device adapted to fit a bed of a truck, or other similar vehicle. The staircase provides a mechanism for facilitating the loading and unloading of items onto and off a bed of a truck. The staircase further provides a safe way to access the bed of a truck. A hitch device attached to the staircase may be adapted to fit a hitch receiver of a truck or other vehicle. In addition, the staircase device does not interfere with normal operation of the vehicle.

Figure 1:
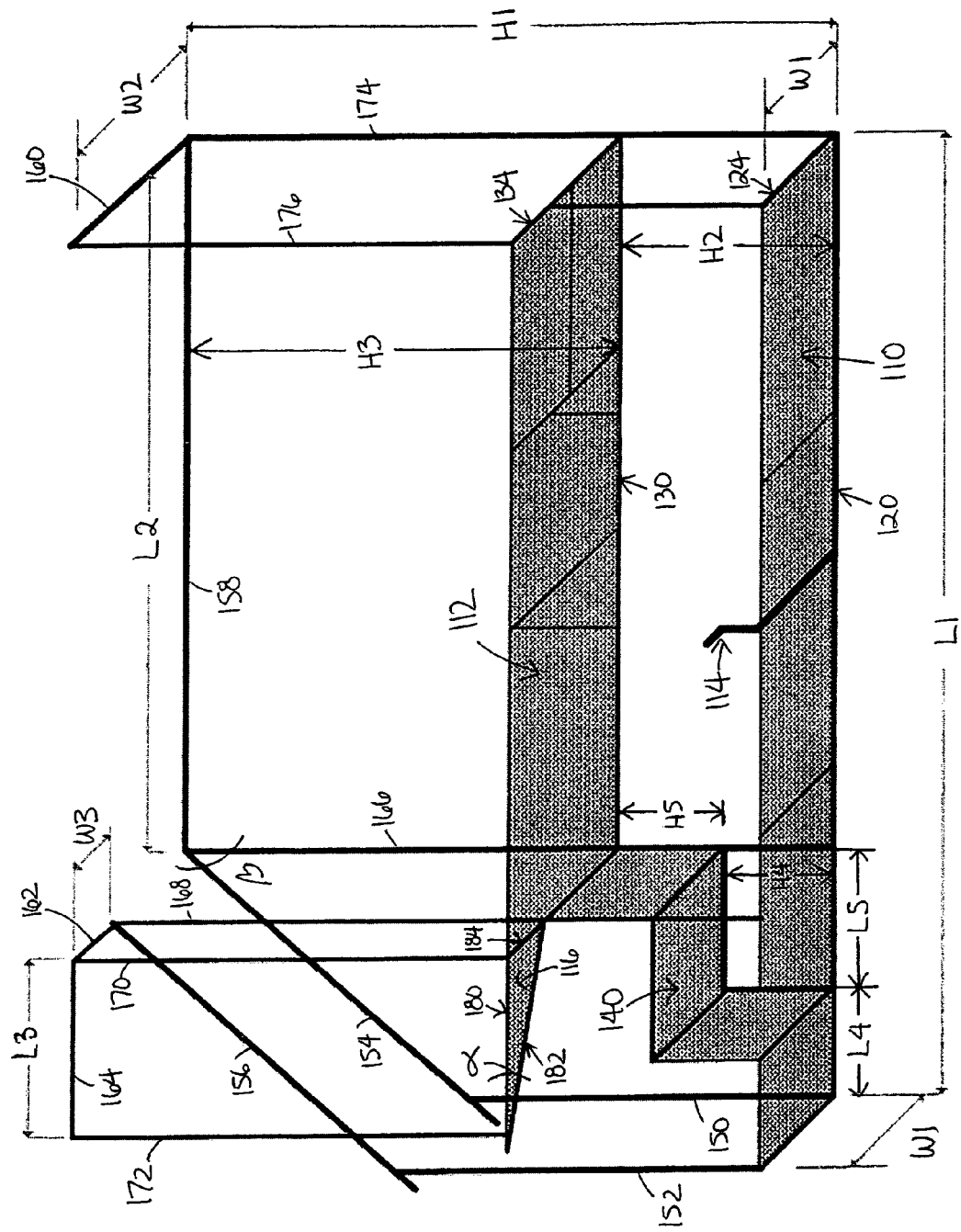
FIG. 1 illustrates an exemplary staircase device, according to an embodiment of the present invention.

FIG. 1 illustrates an exemplary staircase device, according to an embodiment of the present invention. Staircase device 100 may include two parallel platforms. A first platform 110 may have a length 120 of a first length L1. First length L1 may be approximately equal to a length of a bed of a vehicle that connects to staircase device 100. The first platform may have a width 124 of a first width W1. A second platform 112 may have a length 130 of a second length L2. The second platform may have a width 134 of a second width W2. First platform 110 and second platform 112 may be connected by a stair structure that includes step 140. While a single step is shown in this exemplary embodiment, additional steps may be included. In this example, first length L1 is greater than second length L2 and first width W1 is less than second width W2.

An additional third platform 116 may be connected to second platform 112. Third platform 116 may include a length 180 having a third length L3 and a width 184, having a third width W3. Third platform 116 may be a triangular shape, preferably a right triangle, having sides 180, 184 and 182. For example, angle α may be approximately 30 degrees. Third platform 116 may include other shapes and sizes. According to an exemplary embodiment, second length L2 of second platform 112 and third length L3 of third platform 116 may be substantially equal to first length L1 of first platform 110. In addition, first width W1 of first platform 110 and third width W3 of third platform 116 may be substantially equal to second width W2 of platform 112.

According to an exemplary embodiment, first length L1 may be approximately 60 inches, second length L2 may be approximately 45 inches and third length L3 may be approximately 15 inches. First width W1 may be approximately 25 inches, second width W2 may be approximately 35 inches and third width W3 may be approximately 10 inches. Other variations and scales may be realized, depending on the desired application and/or the size of the vehicle to be adapted to.

When connected to a bed of a truck or other vehicle, third platform 116 and/or a portion of second platform 112 may rest on the bed of the truck or other portion of the truck. The staircase device may be attached so that the device 100 is suspended from the bed of the truck. Hitch adaptor 114 may fit a hitch receiver of a truck or other vehicle. Other mechanisms for attaching staircase device 100 to the back of a vehicle may be implemented. Additional mechanisms for securing the staircase device to the vehicle may also be incorporated. For example, additional brace devices may secure the staircase device to the vehicle. Brace devices may include a mechanism for securely attaching to a bumper (or other part) of the vehicle. One or more brace devices may be used. Exemplary brace devices may include brackets, clamps, etc.

First platform 110, second platform 112 and third platform 116 may be made of a metal material (e.g., expanded metal, etc.), plastic material, other type of durable sturdy material (e.g., wood, natural or synthetic materials, etc.) and/or other composite material. The platforms may be made of the same or different material. Step 140 of the stair structure may be made of a metal material, plastic material and/or other type of material (e.g., durable study material, composite material, etc.).

Staircase device 100 may also include a handrail structure for safety. Parallel poles 150 and 152 may connect to handrails 154 and 156, respectively. Handrails 154 and 156 may connect to parallel poles 166 and 168, respectively. An additional rail 158 may connect to poles 166 and 174. Rail 160 may connect to parallel poles 174 and 176. For additional support, rail 162 may connect to pole 168 and 170. Finally, rail 164 may connect to parallel poles 170 and 172. The poles and rails may be made of a metal material, plastic material and/or other durable sturdy material. For example, a tubing, such as square tubing or other shaped tubing, may be implemented for the handrail structure. According to another exemplary embodiment, the poles and rails may be enclosed by a sheet of metal or other material. For example, a sheet of metal or other material may be attached to rail 158 and poles 166 and 174 to form a wall. This exemplary embodiment may essentially expand the space of the truck bed by the width of the staircase device. A similar structure may be applied to other rails and poles within staircase device 100.

According to an exemplary embodiment, poles 150 and 152 may have an approximate height of 32 inches. Also, poles 166 and 168 may have an approximate height of 32 inches. The height of the entire staircase device H1 may be approximately 54 inches. Height H2 may be approximately 22 inches and height H3 may be approximately 32 inches. The height of the steps H4 and H5 may each be approximately 11 inches and the length of the steps L4 and L5 may be each approximately 8 inches. In addition, handrails 154 and 156 may have a length of approximately 25 inches, with an angle β of approximately 36 degrees. Other measurements and scales may be implemented in accordance with various applications. Further, the measurements may be modified depending on the size of the vehicle to be adapted to and/or other considerations.

While a stair structure with step 140 is shown on one side of the staircase device 100, the stair structure may be implemented on the other side of the staircase device 100, as well as both sides of the staircase device 100.

Figure 2:
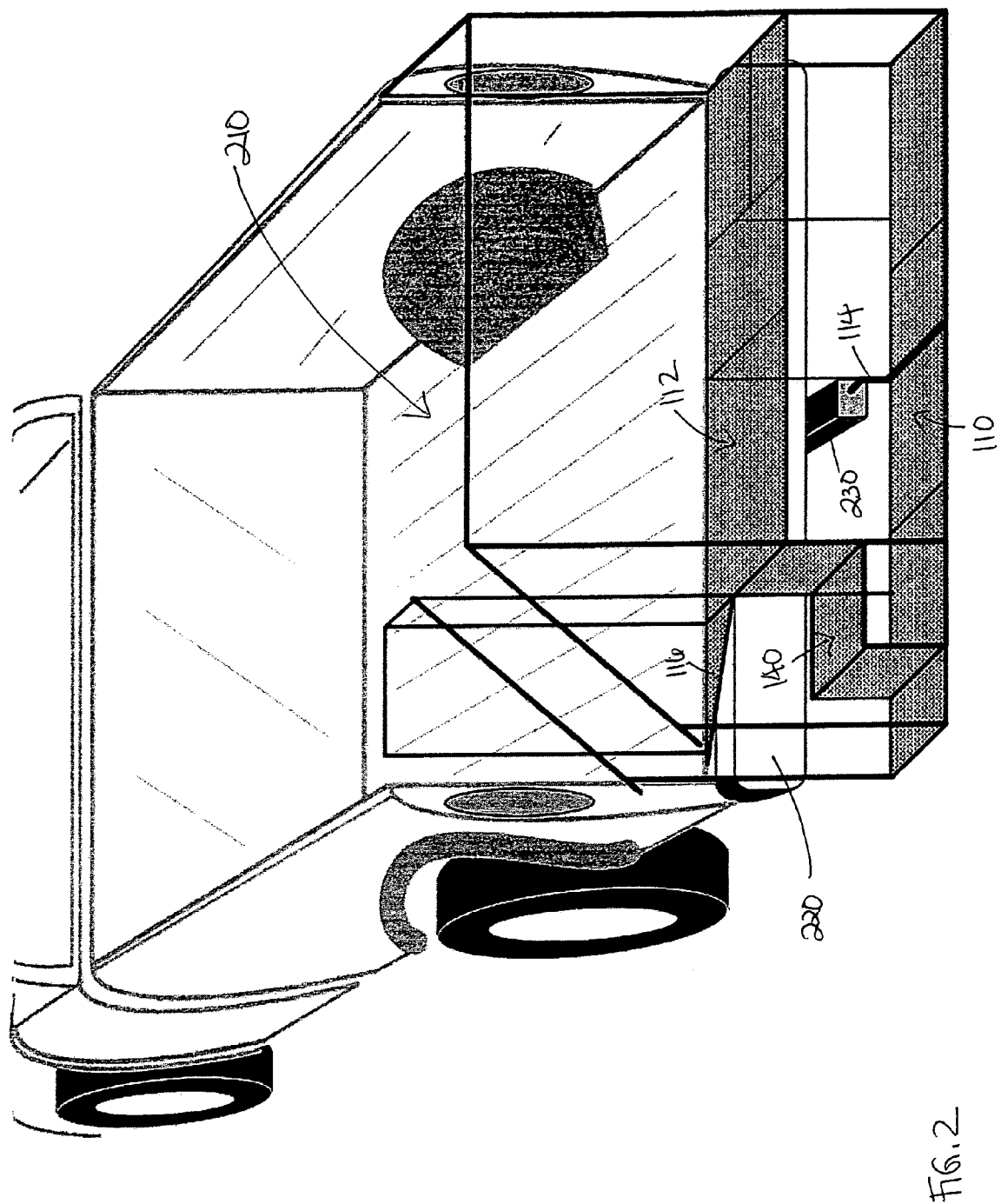
FIG. 2 illustrates an exemplary staircase device connected to a vehicle, according to an embodiment of the present invention.

FIG. 2 illustrates an exemplary staircase device connected to a vehicle, according to an embodiment of the present invention. As shown in this figure, third platform 116 and a portion of second platform 112 may rest on a bed of a truck 210 and/or part of a bumper 220 of a truck. The surface of the second platform 112 may be flush with the surface of the bed of the truck 210 to form a continuous surface. In addition, a portion of the second platform 112 may rest on a tailgate of a truck or other portion of a truck. Hitch adapter 114 may connect to a hitch 230 of the vehicle.

Figure 3:
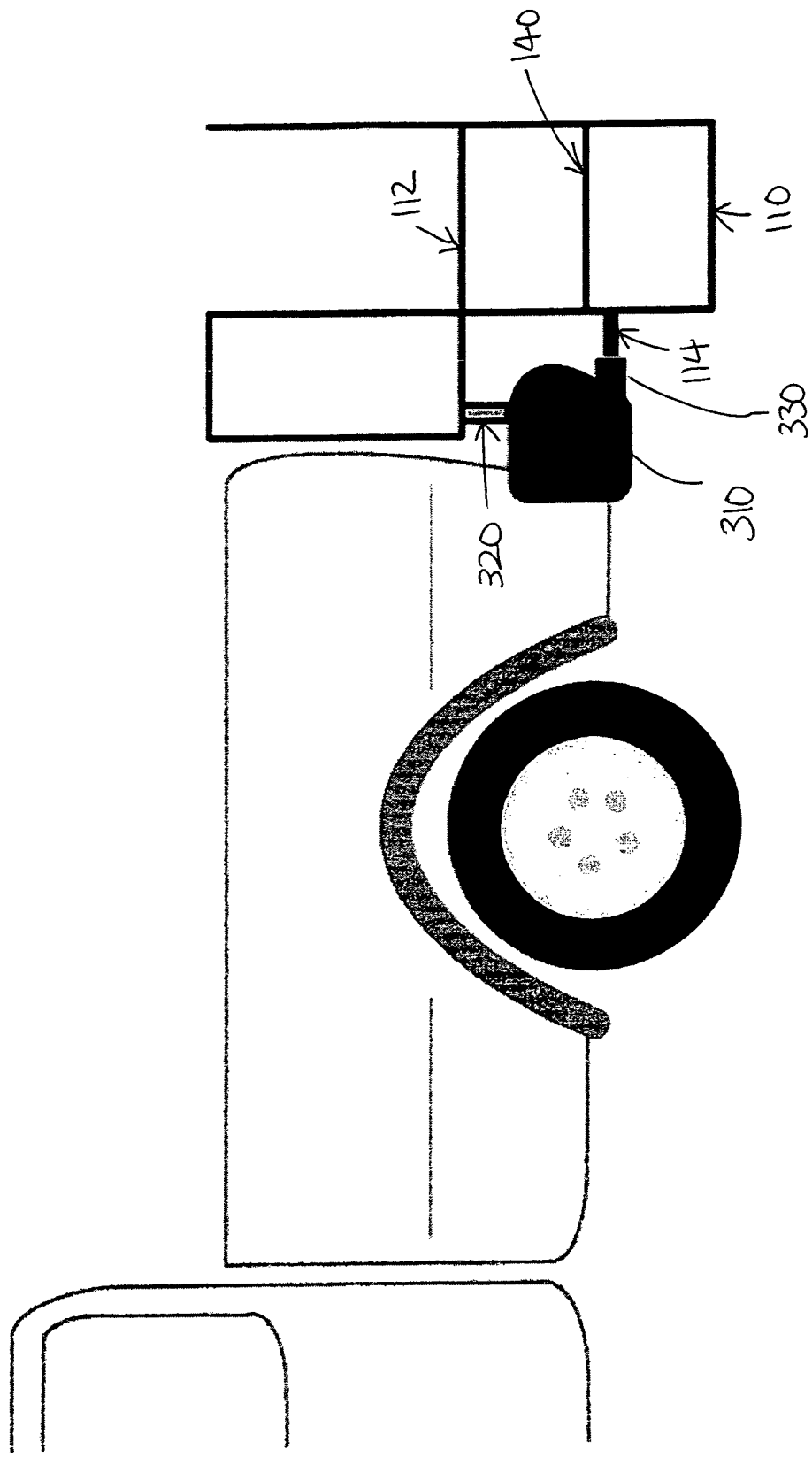
FIG. 3 illustrates another view of an exemplary staircase device connected to a vehicle, according to an embodiment of the present invention.

FIG. 3 illustrates another view of an exemplary staircase device connected to a vehicle, according to an embodiment of the present invention. As shown in this figure, platform 110, step 140 and second platform 112 form a staircase structure to facilitate boarding onto a bed of a truck or other vehicle. Hitch adapter 114 may connect to hitch 330, which may be further connected to bumper 310 or another part of the vehicle. In this figure, brace 320 may provide an additional attachment device for securely attaching the staircase structure of the vehicle. While a single brace is shown, additional braces and/or other attachment devices may be implemented.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A vehicle staircase device comprising:
    a first lower platform having a first length and a first width, the first lower platform having a hitch connector adapted to connect to a vehicle, the first lower platform having a first edge and a second edge spaced apart by the first length;
    a second platform, spaced vertically apart from and above the first lower platform, having a second length and a second width, wherein the first lower platform and the second platform are substantially parallel, the second length being less than the first length and the second width is greater than the first width;
    a staircase structure connecting the first lower platform and the second platform, the staircase structure comprising at least a first stair structure located a first height orthogonal to the first lower platform and having a stair structure width substantially equal to the first width, the first stair structure being oriented such that a stair structure length is parallel to the first length and the stair structure length overlaps at least a portion of the first length and the first stair structure originates at a distance measured parallel to the first length and originating from either the first edge or the second edge;
    an extension section having a third length and a third width, the third width being substantially equal to the difference between the first width and the second width, the extension section connected to the second platform, with the second length and third length together being substantially equal to the first length.

2. The device of claim 1, wherein a portion of the second platform is capable of resting on top of a bed of a vehicle.

3. The device of claim 1, wherein the first length is so dimensioned to be substantially equal to a length of a bed of a vehicle.

4. The device of claim 1, further comprising a handrail structure proximal to the staircase structure.

5. The device of claim 4, wherein the handrail structure extends across the first length.

6. The device of claim 4, wherein the handrail structure comprises two parallel handrails for the staircase structure.

7. The device of claim 1, wherein the extension section is capable of resting on top of a bed of a vehicle.

8. The device of claim 1, wherein the second platform is so dimensioned to be substantially flush with a bed of the vehicle.

9. The device of claim 1, wherein the device is capable of attaching to a truck.

10. The device of claim 1, further comprising a brace structure for securely connecting a vehicle staircase device to a vehicle.

11. The device of claim 10, wherein the brace structure comprises one or more brace devices.

12. The device of claim 10, wherein the brace structure is connected to one or more of the first lower platform and the second platform.

13. The device of claim 1, wherein the vehicle staircase device is capable of being suspended from a vehicle.

14. A vehicle staircase device comprising:
- a first lower platform having a first length and a first width, the first lower platform having a hitch connector adapted to connect to a vehicle, the first lower platform having a first edge and a second edge spaced apart by the first length;
- a second platform, spaced vertically apart from and above the first lower platform, having a second length and a second width, wherein the second length is less than the first length and the second width is greater than the first width; wherein a portion of the second platform rests on top of a bed of the vehicle;
- a staircase structure connecting the first lower platform and the second platform, the staircase structure comprising at least a first stair structure located a first height orthogonal to the first lower platform and having a stair structure width substantially equal to the first width, the first stair structure being oriented such that a stair structure length is parallel to the first length and the stair structure length overlaps at least a portion of the first length and the first stair structure originates at a distance measured parallel to the first length and originating from either the first edge or the second edge;
- an extension section having a third length and a third width, the third width being substantially equal to the difference between the first width and the second width, the extension section connected to the second platform, with the second length and third length together being substantially equal to the first length; and
- a handrail structure proximal to the staircase structure, wherein the handrail structure comprises two parallel handrails for the staircase structure;
- wherein the first lower platform and the second platform are substantially parallel.

15. The device of claim 14, wherein the extension section is capable of resting on top of a bed of a vehicle.

16. The device of claim 14, wherein the device is capable of attaching to a truck.

* * * * *

UNITED STATES PATENT AND TRADEMARK OFFICE
CERTIFICATE OF CORRECTION

PATENT NO. : 7,658,266 B1
APPLICATION NO. : 11/187926
DATED : February 9, 2010
INVENTOR(S) : Mark A. Clement It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 985 days.

Signed and Sealed this

Twenty-eighth Day of December, 2010

David J. Kappos
*Director of the United States Patent and Trademark Office*